US006555210B1

(12) United States Patent
Masuda et al.

(10) Patent No.: US 6,555,210 B1
(45) **Date of Patent: *Apr. 29, 2003**

(54) CHARGING MEMBER AND CHARGING DEVICE

(75) Inventors: Yoshitomo Masuda, Hamura (JP); Gaku Yakushiji, Kodaira (JP); Takahiro Kawagoe, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/291,761

(22) Filed: Apr. 14, 1999

(30) Foreign Application Priority Data

| | | |
|---|---|---|
| Apr. 14, 1998 | (JP) | 10-119982 |
| Apr. 14, 1998 | (JP) | 10-119983 |
| Apr. 14, 1998 | (JP) | 10-119984 |
| Apr. 14, 1998 | (JP) | 10-119985 |

(51) Int. Cl.[7] .......................... G03G 5/14; G03G 15/14; G03G 15/02; G03L 15/00; B32B 25/08

(52) U.S. Cl. ....................... 428/212; 428/421; 399/302; 399/168; 399/174; 399/176; 399/50; 361/225

(58) Field of Search ................................ 428/212, 421; 399/302, 168, 174, 176, 50; 492/53; 361/225; 430/66

(56) References Cited

U.S. PATENT DOCUMENTS

| | | | | | |
|---|---|---|---|---|---|
| 5,084,735 | A | * | 1/1992 | Rimai et al. | 355/271 |
| 5,732,314 | A | * | 3/1998 | Tsukida et al. | 399/302 |
| 5,761,581 | A | * | 6/1998 | Nojima | 399/174 |
| 5,786,091 | A | * | 7/1998 | Kurokawa et al. | 428/421 |
| 5,792,533 | A | * | 8/1998 | Kurokawa et al. | 428/36.9 |
| 5,893,821 | A | * | 4/1999 | Ando et al. | 492/59 |
| 5,910,386 | A | * | 6/1999 | Yoshinaga et al. | 430/66 |
| 5,982,606 | A | * | 11/1999 | Masuda et al. | 361/225 |
| 5,995,792 | A | * | 11/1999 | Jo | 399/286 |
| 6,004,669 | A | * | 12/1999 | Rokutan et al. | 428/335 |
| 6,020,054 | A | * | 2/2000 | Masuda et al. | 428/319.3 |
| 6,090,492 | A | * | 7/2000 | Tsuchiya et al. | 428/421 |
| 6,175,712 | B1 | * | 1/2001 | Masuda et al. | 399/302 |

* cited by examiner

*Primary Examiner*—Cynthia H. Kelly
*Assistant Examiner*—Kimberly T. Nguyen
(74) *Attorney, Agent, or Firm*—Sughrue Mion, PLLC

(57) ABSTRACT

A new charging member which is durable enough to exhibit stable performance over a long period of time without deterioration by the sticking of toner particles. It is characterized by its surface having a universal hardness no higher than 10 $N/mm^2$ at a depth equivalent to the diameter of toner particles.

18 Claims, 1 Drawing Sheet

CHARGING MEMBER AND CHARGING DEVICE

BACKGROUND OF THE INVENTION

The present invention relates to a charging member and a charging device equipped therewith, the charging member being designed to charge a latent image supporting body such as a photosensitive body thereon used for the electrostatic latent image process in copying machines, printers, and the like.

The conventional electrophotoprocess for copying machines and printers consists of uniformly charging the surface of a photosensitive body, exposing this photosensitive body to an image through an optical system, thereby causing the exposed part to lose charge and form a latent image, supplying a toner so as to form a toner image, and transferring the toner image to a recording medium such as paper, thereby completing printing.

A common way to charge the photosensitive body has been by corona discharge. This charging system, however, needs a high voltage (6–10 kV) and hence is undesirable for machine safety and maintenance. Moreover, corona discharge evolves ozone which poses an environmental problem.

Efforts have been made to contrive new charging systems which work at a lower voltage than corona discharge without giving off ozone. An example is that of contact type which is designed to press a charging member with a voltage applied to it against the photosensitive body to be charged.

The charging member for this system consists of an elastic layer of rubber or urethane foam, for example and a coating layer formed thereon from a resin solution of nylon, acryl, or urethane, for example by dipping or spraying.

This charging system, however, poses a problem with the durability of the charging member which is in contact with the photosensitive body to be charged at all times. This problem does not exist in the corona discharge system that employs a wire for discharge which is not in contact with the photosensitive body.

In the contact charging system, the durability of the charging member is greatly affected by residual toner particles. In other words, a very small amount of toner remaining on the surface of the photosensitive drum because of incomplete transfer or cleaning sticks to or even penetrates into the surface of the charging member, which results in inadequate charging. The drastic measure against this trouble is to improve the efficiency of transfer and cleaning, thereby preventing residual toner particles from moving from the surface of the photosensitive drum to the charging member. With the existing technology, it is difficult to eliminate residual toner particles completely. One way proposed so far to prevent residual toner particles from sticking to the surface of the charging member is to coat the surface of the charging member with a fluoro resin or silicone resin having good stain resistance. Such coating is effective but is not sufficiently durable.

Residual toner particles have an adverse effect only a little on the image even though they stick in small amounts to the surface of the charging member. However, after repeated printing over a long period of time, residual toner particles sticking to the surface of the charging member penetrate into the surface of the charging member. Once this occurs, residual toner particles begin to accumulate with an increasing speed, resulting in apparently defective images.

SUMMARY OF THE INVENTION

The present invention has been completed in view of the foregoing. It is an object of the present invention to provide a new charging member and a charging device equipped therewith, the charging member is durable enough to exhibit stable performance over a long period of time without deterioration by sticking toner particles when used for the electrostatic latent image process for copying machines and printers.

In order to achieve the above-mentioned object, the present inventors have carried out a series of researches on the electrophotoprocess which involves the steps of uniformly charging a surface of a latent image supporting body, exposing the charged latent image supporting body to an image, thereby causing the exposed part to form a latent image, and supplying a toner so as to make the electrostatic latent image visible, with the charging being accomplished by bringing a charging member into contact with the latent image supporting body. As a result, it has been found that the charging member provides stable charge over a long period of time without being deteriorated by sticking toner particles, if it has a surface whose universal hardness is no higher than 10 N/mm$^2$ at a depth equivalent to the diameter of toner particles or at a depth of 7 $\mu$m. The present invention is based on this finding.

The universal hardness represents hardness at a desired depth in an extremely thin surface of the charging member. This depth is equal to the depth of the indentation produced by a toner particle penetrating into the surface of the charging member. In other words, this depth is equal to the diameter of a toner particle. This implies that if the surface of the charging member has an adequate universal hardness at a depth equal to the diameter of a toner particle, then it would effectively prevent the penetration of toner particles into it. Even though the diameter of a toner particle is not known exactly, it is practical to establish an adequate universal hardness at a depth of 7 $\mu$m which is equivalent to the diameter of particles of common toners. The present inventors have found that a universal hardness no higher than 10 N/mm$^2$ is adequate. The present invention is based on this finding.

The first aspect of the present invention resides in a charging member to be used in the electrophotoprocess which involves the steps of uniformly charging the surface of the latent image supporting body, exposing the charged latent image supporting body to an image, thereby causing the exposed part to form a latent image, and supplying a toner so as to make the electrostatic latent image visible, with the charging being accomplished by bringing the charging member into contact with the latent image supporting body, wherein (1) the charging member is characterized by having a surface whose universal hardness is no higher than 10 N/mm$^2$ at a depth equivalent to the diameter of toner particles or (2) the charging member is characterized by having a surface whose universal hardness is no higher than 10 N/mm$^2$ at a depth of 7 $\mu$m.

The second aspect of the present invention resides in a charging device to be used in the electrophotoprocess which involves the steps of uniformly charging the surface of the latent image supporting body, exposing the charged latent image supporting body to an image, thereby causing the exposed part to form a latent image, and supplying a toner so as to make the electrostatic latent image visible, with the charging being accomplished by bringing a charging member into contact with the latent image supporting body, wherein the charging device is characterized by being equipped with either of the charging members (1) and (2) defined above.

DESCRIPTION OF THE INVENTION

Figure 1:
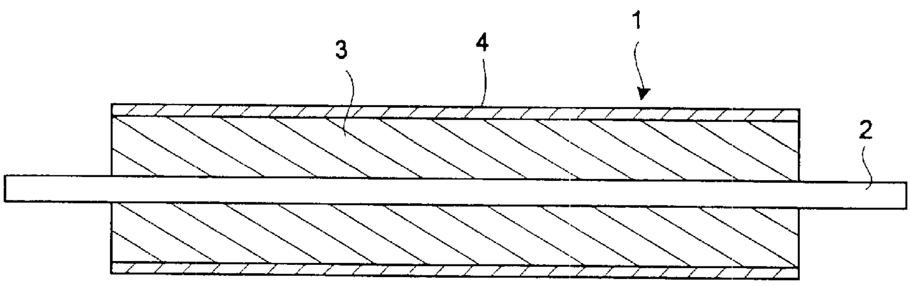
FIG. 1 is a sectional view showing an example of the charging member pertaining to the present invention.

A detailed description of the invention follows.

According to the present invention, the charging member has a surface with an adequate universal hardness, so that it keeps its good charging performance for a long period of time without being deteriorated by toner particles sticking to it.

The universal hardness is a physical value measured by forcing an indenter under a known load into an object. It is defined as the load divided by the surface area of the indentation and is expressed in terms of $N/mm^2$.

The measurement of universal hardness can be accomplished by using any commercial hardness meter such as ultramicrohardness meter H-100V (made by Fischer). The apparatus is deigned such that a regular or triangular pyramidal indenter is forced under a known load into an object up to a prescribed depth and the depth of indentation is converted into the surface area of indentation. It is calculated by dividing the load by the surface area of indentation.

According to the present invention, the charging member should have a surface whose universal hardness is no higher than 10 $N/mm^2$, preferably 0.1–9 $N/mm^2$, at a depth equivalent to the diameter of a toner particle. To be more specific, in the case where a toner with a particle diameter of 5 $\mu$m is used for electrophotography, the charging member should have a surface whose hardness is adjusted such that the hardness meter registers a universal hardness in the range specified above when its indenter is forced into the surface up to a depth of 5 $\mu$m. If the diameter of toner particles is not known exactly, it may be assumed 7 $\mu$m which is the diameter of toner particles in common use. This assumption makes it possible to produce a practically satisfactory effect even though the depth for measurement of universal hardness is slightly different from the diameter of toner particles in actual use.

The condition for measurement of universal hardness is not specifically restricted so long as it permits measurement of universal hardness at the above-specified depth. For example, measurement with the ultramicrohardness meter H-100V (made by Fischer) may be accomplished under the following conditions.

Indenter: Regular pyramidal diamond indenter with a dihedral angle of 136° between opposite faces.

Initial load: 0.02 mN.

Maximum load: 100–400 mN.

The indenter is forced gradually into the surface of the charging member up to a prescribed depth, and the universal hardness is calculated from the load and the surface area of indentation.

According to the present invention, the charging member is not specifically restricted so long as it meets the above-mentioned requirement for universal hardness. However, it is desirable that the surface of the charging member recover from deformation due to measurement of universal hardness in such a way that the ratio of the elastic energy to the sum of the elastic energy and plastic energy is no less than 0.4, particularly in the range of 0.5 to 1. The above-specified value determines not only the surface hardness but also the deformation energy of the surface at its extremely small depth which greatly affects the penetration of toner particles. The charging member meeting this requirement effectively prevents the sticking of toner particles due to their penetration and hence has improved durability.

The elastic energy and plastic energy, which are involved in surface deformation, may be measured as the indenter is forced under a gradually increasing load into a specimen and then the load is decreased. The measurement in this way is based on the principle that as the load on the indenter is increased and then decreased and removed the surface completely recovers or the indenter returns to its original position if it is a perfect elastic body whereas it does not recover completely or the indenter does not return to its original position if it is a perfect plastic body. The results of this measurement reveal the behavior of deformation energy in the extremely shallow region of the surface, which has never been known by the conventional test for permanent compression deformation.

According to the present invention, the elastic energy and plastic energy measured as mentioned above should be related to each other such that the ratio of the elastic energy to the sum of the elastic energy and plastic energy is no less than 0.4, preferably in the range of 0.5 to 1. The total energy (or the sum of the elastic energy and plastic energy) may be calculated by computer from the product of the load applied to the indenter and the depth of indentation, and the elastic energy may be calculated by computer from the product of the load which has decreased during recovery and the distance (or depth) the load has traveled during recovery.

Incidentally, the measurement of elastic energy and plastic energy may be accomplished under the same conditions as mentioned above for the measurement of universal hardness. In other words, a prescribed load should be applied for indentation and then kept applied for about 10 seconds before its removal.

The charging member of the present invention is not specifically restricted in its shape and structure. However, it is usually composed of an elastic layer and one or more coating layers as outer layers formed thereon. It may assume any shape, such as roll, plate, and block, so long as it is in stable contact with the latent image supporting body and supplies charge uniformly to it by voltage application. A preferred shape is usually a roll. As illustrated in FIG. 1, the charging member 1 is made up of a shaft 2, an elastic layer 3 formed thereon, and an outer layer 4 formed thereon. The shaft 2 may be made of metal or plastics or may be omitted depending on the configuration of the charging member or the mechanism in which the charging member is used.

If the charging member of the present invention is of the type in which more than one outer layer 4 are formed, the following condition should be satisfied.

$H^1/H^2<50$, preferably $H^1/H^2<40$, more preferably $H^1/H^2<30$, where $H^1$ is a universal hardness at a depth corresponding to the thickness of the outermost layer and $H^2$ is a universal hardness at a depth 10 times as much as the depth of corresponding to the thickness of the outermost layer.

To be more specific, the charging member should be made such that the universal hardness measured at a depth of 5 $\mu$m which corresponds to a 5 $\mu$m thick outermost layer is $H^1$ and the universal hardness measured at a depth of 50 $\mu$m is $H^2$ and the ratio of $H^1/H^2$ is within the above-specified range. The measurement of universal hardness in this case may be accomplished under the same conditions as mentioned above.

A detailed description is given below about the elastic layer 3 and the outer layer 4 constituting the charging member of the present invention.

The elastic layer 3 may be formed from any elastic material, such as rubber and resin or foam conventionally used for the elastic layer of the charging member, so long as the universal hardness specified above is eventually obtained. Examples of such materials include rubber compounds based on any of polyurethane, silicone rubber, butadiene rubber, isoprene rubber, chloroprene rubber, styrene-butadiene rubber, ethylene-propylene rubber, polynorbornane rubber, styrene-butadiene-styrene rubber, and epichlorohydrin rubber. Preferable among these examples is polyurethane, particularly foamed polyurethane with an expansion ratio of 1.5–50 and a foam density of 0.05–0.9 $g/cm^3$.

The elastic layer 3 may be given prescribed electroconductivity by incorporation with any electric conducting material exemplified below.

Cationic surface active agents in the form of quaternaryammonium salt, such as lauryltrimethylammonium, stearyltrimethylammonium, octadodecyltrimethylammonium, dodecyltrimethylammonium, hexadecyltrimethylammonium, perchlorate, chlorate, hydroborate, or ethosulfate of modified fatty acid-dimethylethylammonium, and benzyl halide such as benzyl bromide and benzyl chloride.

Anionic surface active agents, such as aliphatic sulfonate, higher alcohol sulfate ester, higher alcohol ethylene oxide-added sulfate ester salt, higher alcohol phosphate ester salt, and higher alcohol ethylene oxide-added phosphate ester salt.

Amphoteric surface active agents, such as betaines.

Nonionic antistatic agents, such as higher alcohol ethylene oxide, polyethylene glycol fatty acid ester, and polyhydric alcohol fatty acid ester.

Salts of metals, e.g., $Li^+$, $Na^+$, and $K^+$ belonging to Group I of the periodic table, such as $LiCF_3SO_3$, $NaClO_4$, $LiAsF_6$, $LiBF_4$, NaSCN, KSCN, and NaCl.

Electrolytes, such as $NH_4^+$ salts.

Salts of metals, e.g., $Ca^{2+}$ and $Ba^{2+}$ belonging to Group II of the periodic table, such as $Ca(ClO_4)_2$.

Those of the above-mentioned antistatic agents which have at least one group such as hydroxyl group, carboxyl group, and primary or secondary amine containing an active hydrogen reactive with isocyanate.

Ionic conducting materials in the form of complex with polyhydric alcohol (or derivatives thereof) such as 1,4-butanediol, ethylene glycol, polyethylene glycol, propylene glycol, and polyethylene glycol, or in the form of complex with monool such as ethyleneglycol monomethyl ether and ethyleneglycol monoethyl ether.

Electric conducting carbon, such as ketjen black EC and acetylene black.

Rubber black, such as SAF, ISAF, HAF, FEF, GPF, SRF, FT, and MT.

Acid-treated carbon for color ink, pyrolytic carbon, natural graphite, and artificial graphite.

Metals and metal oxides, such as antimony-doped tin, titanium oxide, zinc oxide, nickel, copper, silver, and germanium.

Conducting polymers, such as polyaniline, polypyrrole, and polyacetylene.

These conducting materials may be used in an adequate amount according to the kind of the composition so that the elastic layer 3 has a volume resistivity of $10^0$–$10^8$ Ω·cm, preferably $10^2$–$10^6$ Ω·cm.

The elastic layer 3 should preferably but not restrictively be formed such that it has a storage modulus (E') smaller than $5\times10^7$ $dyn/cm^2$ and a tan δ smaller than 0.3 as the ratio of loss modulus (E") to storage modulus (E'). This condition is necessary for the charging member to work quietly as explained below.

The contact charging system usually employs as the charging voltage an AC voltage superimposed on a DC voltage in order to ensure uniform images. Application of an AC voltage generates an electrostatic attractive force between the charging member and the object to be charged. This force brings about vibration and noise. This trouble can be effectively avoided if the elastic layer 3 has a storage modulus (E') and tan δ as specified above.

The storage modulus (E'), loss modulus (E"), and tan δ can be measured according to Japanese Industrial Standard (JIS) K-7198 by using a dynamic visco-elasticity measuring apparatus under the following conditions.

Temperature: 25° C.

Set strain: 0.5%

Static strain: 1.0%

Frequency: 1 Hz

Desirable values of the storage modulus (E') are no higher than $2\times10^7$ $dyn/cm^2$, particularly in the range of $1\times10^2$ to $1\times10^7$ $dyn/cm^2$, and desirable values of the tan δ are no higher than 0.25, particularly in the range of 0.01 to 0.2.

The outer layer 4 constituting the surface of the charging member is not specifically restricted so long as it has a universal hardness in the above-mentioned range. It may be formed from a coating solution of resin such as polyester resin, acrylic resin, urethane resin, acrylic-urethane resin, nylon resin, epoxy resin, polyvinyl acetal resin, vinylidene chloride resin, fluoro resin, and silicone resin. The coating solution may be either organic or aqueous, and the latter is preferable for good smoothness if the outer layer 4 is formed directly on the elastic layer 3. An aqueous coating solution does not swell the elastic layer 3 dipped therein, and a smooth surface prevents the sticking of toner particles and contributes to good durability. The aqueous coating solution may be of the form of solution, emulsion, or suspension.

The outermost layer of the charging member should preferably but not restrictively be formed from a fluoro resin so that the charging member has a smooth surface and shows a weak tendency to adhesion to the latent image supporting body. Preferred examples of the fluoro resin include polytetrafluoroethylene, tetrafluoroethylene-perfluoroalkyl vinyl ether copolymer, tetrafluoroethylene-hexafluoropropylene-perfluoroalkyl vinyl ether copolymer, tetrafluoroethylene-ethylene copolymer, polychlorotrifluoroethylene, chlorotrifluoroethylene-ethylene copolymer, polyvinylidene fluoride, and polyvinyl fluoride. They may be used in the form of aqueous dispersion of fine particles. Of these examples, polytetrafluoroethylene in the form of aqueous dispersion of fine particles is desirable. The particle diameter of the fluoro resin should preferably be no larger than 5 μm, particularly 0.05–1 μm, although not restrictive.

The fluoro resin to form the outer layer 4 or the outermost layer may be incorporated with any one or more resins exemplified below in an amount not harmful to its effect.

Polyvinyl acetal resin, urethane resin, polyester resin, vinylidene chloride copolymer, acrylic resin, nylon resin, and epoxy resin. Of these examples, the first four are desirable, particularly the first one is desirable.

The outer layer 4 may be incorporated with a conducting material so as to impart conductivity to it or to control its conductivity. Carbon is a desirable conducting material; it is particularly desirable when used for the outermost layer. Carbon for the outer layer 4 is not specifically restricted; but it should preferably have an oxygen content no less than 5%, desirably no less than 7%, and more desirably no less than 9%, and have a pH no lower than 5, desirably no lower than 6, and more desirably no lower than 7. This condition is necessary for the carbon to be stable in an aqueous coating solution of fluoro resin. Ordinary carbon has an oxygen content of 0.1–3% and becomes more acidic (decreases in pH) with its increasing oxygen content as in the case of oxygen-treated carbon. Acidic carbon is unstable in an aqueous coating solution of fluoro resin. By contrast, the above-specified carbon in the present invention remains neutral or alkaline despite its high oxygen content and stable in an aqueous coating solution of fluoro resin. Details are not known about the structure of carbon having the specific oxygen content and pH. Another preferred carbon is one which has on its surface functional groups such as carboxyl groups, hydroxyl groups, and ketone groups, with hydrogen therein partly replaced by alkali metal such as sodium.

The amount of the above-mentioned conducting material may be properly controlled so that the outer layer 4 has a desired volume resistivity of $10^3$–$10^{12}$ Ω·cm, preferably $10^5$–$10^{10}$ Ω·cm. The amount of carbon as the conducting material is usually 0.01–40 wt %, particularly 5–20 wt %, of the outer layer 4.

The outer layer 4 may be incorporated with optional organic or inorganic additives, such as thickener, thixotropic agent, and structural viscosity agent, in proper amounts.

The thickness of the outer layer 4 is not specifically restricted; but it should preferably be no larger than 30 μm, particularly 1–15 μm. With a thickness larger than 30 μm, the outer layer 4 is stiff and liable to cracking with decreased durability.

The outer layer 4 formed from the above-mentioned aqueous coating solution should have water insolubility no lower than 70%, preferably no lower than 80%, more preferably no lower than 90%, calculated from the equation (1) below.

$$\text{Water insolubility } (\%) = (B/A) \times 100 \quad (1)$$

where A is the weight of the coating film before dipping in water and B is the weight of the coating film after dipping in water at 25° C. for 24 hours.

This condition is necessary for the coating film forming the outer layer 4 to have improved durability and to produce the effect of preventing the toner sticking for a long period of time.

One or more additional resin layers may be interposed between the elastic layer 3 and the outer layer 4, although they are not shown in FIG. 1. These additional layers permit the surface of the charging member to have desired physical properties such as universal hardness. They may be formed from the same resin as used for the outer layer 4 so that they have the above-specified universal hardness. One of them in direct contact with the elastic layer 3 should preferably be formed from an aqueous coating solution of resin as in the case of the outer layer 4. Examples of such a resin include acrylic resin, polyester resin, urethane resin, and polydioxorane resin, which have active hydrogen atoms in the form of carboxyl group, hydroxyl group, and amino group and are soluble in warm water. Of these examples, acrylic resin is desirable.

These additional resin layers may also be incorporated with optional organic or inorganic additives, such as crosslinking agent, thickener, thixotropic agent, and structural viscosity agent, in proper amounts. Examples of the crosslinking agent include those of epoxy, oxazoline, melamine, isocyanate, and phenol, with the first two being desirable because of their good crosslinking effect and low crosslinking temperature. The amount of the crosslinking agent is usually 0.1–50 parts by weight for 100 parts by weight of resin, although not specifically restricted.

Moreover, these additional resin layers may also be incorporated with a conducting material so as to impart conductivity to them or to control their conductivity in terms of a volume resistivity of $10^3$–$10^{12}$ Ω·cm, preferably $10^5$–$10^{10}$ Ω·cm. The conducting material may be the same one as used for the elastic layer 3, and carbon is desirable. The amount of the conducting material is not specifically restricted so long as it is enough to impart the above-specified volume resistivity. The amount of carbon is usually 0.01–60 wt %, particularly 10–40 wt %.

The additional resin layers are not specifically restricted in thickness; however, they should preferably be as thin as possible so that they have no adverse effect on the flexibility of the elastic layer 3. A typical thickness is no larger than 1 mm, preferably no larger than 800 μm, and more desirably 20–600 μm.

The resin layer should preferably but not restrictively be formed such that it has a tan δ of 0.15–0.5, particularly 0.2–0.5, as the ratio of loss modulus (E") to storage modulus (E'). This condition is necessary for the charging member to work quietly as explained above for the elastic layer 3. The combination of the resin layer and the elastic layer 3, both having the properly controlled tan δ, prevents the penetration of toner particles while increasing the mechanical loss of the resin layer and decreasing noise level. The resin layer should preferably be formed from an acrylic resin. Having a small dielectric constant, the acrylic resin layer, which is closer to the latent image supporting body to be charged than the elastic layer 3, has a low electrostatic attracting force and hence evolves less noise electrically.

According to the present invention, it is desirable although not restrictive that the above-mentioned layers constituting the charging member be formed such that each layer has a storage modulus (E') which is less than 500 times, preferably less than 100 times, more preferably less than 80 times, the storage modulus (E') of its adjacent layers. The charging member meeting this requirement has improved durability.

"Adjacent layers" means any layer which is in contact with the layer in question. For example, in the case of a roll-shaped charging member consisting of three layers, that is, internal elastic layer, intermediate resin layer, and outer layer, the adjacent layer of the elastic layer is the resin layer, the adjacent layers of the resin layer are the elastic layer and the outer layer, and the adjacent layer of the outer layer is the resin layer. The ratio is expressed in terms of the quotient of the larger value divided by the smaller value.

Layers with specific storage moduli (E') contribute to durability as mentioned above; however, this has not been elucidated completely. A conceivable mechanism is as follows. The charging member of contact type as in the case of the present invention undergoes deformation at all times during use due to contact with the object to be charged. Therefore, its durability depends on its mechanical characteristics, particularly its behavior under repeated deformation. In other words, it is necessary to take measures against toner adhesion as well as repeated deformation. Even though the outermost layer is well protected from toner adhesion, it is still liable to toner accumulation if other layers constituting the charging member crack or peel due to deformation. To avoid this trouble, due consideration should be given to the bonding of individual layers if the charging member is to be formed from more than two layers. Adjacent layers each having a controlled storage modulus (E') as mentioned above are least affected by repeated deformation owing to their balanced mechanical characteristics, which leads to improved durability.

The storage modulus (E') of the elastic layer 3 should be no higher than $5\times10^7$ dyn/cm$^2$, preferably no higher than $2\times10^7$ dyn/cm$^2$, more preferably in the range of $1\times10^2$ to $1\times10^7$ dyn/cm$^2$, and the storage modulus (E') of the outer layer 4 and the resin layer should be no higher than $5\times10^{10}$ dyn/cm$^2$, preferably no higher than $5\times10^9$ dyn/cm$^2$, although these values are not restrictive.

The outer layer 4 and the resin layer may be formed in any unrestricted way, such as coating (by dipping or spraying) from a coating solution containing all the components. If more than one outer layer and more than one resin layer are to be formed, dipping or spraying may be repeated. Coating may also be accomplished by extrusion or any other process so long as the resulting layer has the universal hardness mentioned above.

The charging member of the present invention has good durability owing to its surface material with controlled universal hardness to prevent toner sticking. The effect of preventing toner sticking would be enhanced if the surface material has an Ascar hardness C no higher than 65°, preferably no higher than 60°, which is not specifically restricted.

The charging member should have as smooth a surface as possible because surface irregularities catch toner particles, resulting in poor images. The surface roughness should be lower than 4 μm, preferably lower than 3 μm, more preferably lower than 2 μm, in terms of 10-point average roughness Rz according to JIS, which are not specifically restricted.

The charging member of the present invention is installed in contact with the latent image supporting body such as a photosensitive drum, and a voltage is applied across them so that the latter is charged. This voltage may be either AC or DC, and it is desirable although not mandatory that an AC voltage be superimposed on a DC voltage to ensure uniform charging. In addition, it is desirable although not mandatory that the charging member be brought into contact with the latent image supporting body under a pressure of 50–2000 g, particularly 100–1000 g, to ensure good charging.

Figure 2:
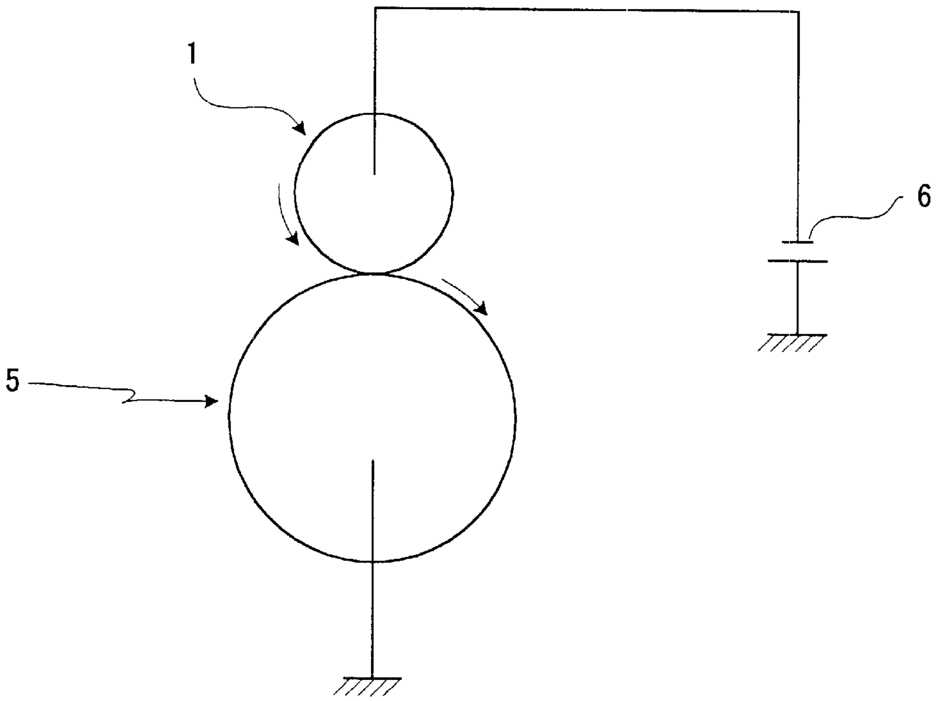
FIG. 2 is a schematic diagram showing an example of the charging device pertaining to the present invention.

The charging member of the present invention may be used as a constituent of the charging device as shown in FIG. 2. This charging device consists of the charging member 1 in the shape of roll, the latent image supporting body 5 such as a photosensitive drum, and the power source 6. The former two are in contact with each other under a prescribed pressure, so that a voltage is applied across the last two. This arrangement is not limitative, and modifications may be made on the shape of the charging member 1 and the latent image supporting body 5 and the method of voltage application.

The charging member of the present invention prevents the sticking of residual toner particles and hence has good durability over a long period of time. The charging device equipped with this charging member carries out charging in a stable manner and hence permits the reproduction of good images over a long period of time.

EXAMPLES

The invention will be described in more detail with reference to the following examples and comparative examples, which are not intended to restrict the scope thereof.

Example 1

A charging roll (or a charging member) was made up of a 3000 μm thick elastic layer (A), a 270 μm thick coating layer (A)(resin layer), and a 5 μm thick coating layer (B)(outer layer), which are formed consecutively one over another on a metal shaft. These layers are explained below. The resulting charging roll was found to have a universal hardness of 5.3 N/mm$^2$ at a depth of 7 μm from the surface, a surface Ascar C hardness of 57.8°, and a surface roughness Rz of 0.57 μm in terms of 10-point average according to JIS.

Elastic layer (A): A urethane foam having a density of 0.55 g/cm$^3$, formed from polyester polyol and isocyanate and incorporated with carbon.

Coating layer (A): Formed from a water-based acrylic resin paint incorporated with carbon to adjust its volume resistivity to $5.1\times10^7$ Ω·cm.

Coating layer (B): Formed from a paint composed of water-dispersible fluoro resin, vinylidene chloride copolymer latex, and polyvinyl acetal resin, incorporated with carbon to adjust its volume resistivity to $2.3\times10^7$ Ω·cm. The carbon contains 10% oxygen and has pH 7.33.

The charging roll was mounted on a printer and images were produced by using a toner with a particle diameter of 7 μm. Good images were obtained. Further, even after continuous 8000 runs of printing, good images were obtained without any anomaly.

Example 2

As in Example 1, a charging roll (or a charging member) was made up of a 3000 μm thick elastic layer (A), a 170 μm thick coating layer (C)(resin layer), and a 9 μm thick coating layer (D)(outer layer), which are formed consecutively one over another on a metal shaft. These layers are explained below. The resulting charging roll was found to have a universal hardness of 6.4 N/mm$^2$ at a depth of 7 μm from the surface, a surface Ascar C hardness of 57.0°, and a surface roughness Rz of 0.63 μm in terms of 10-point average according to JIS.

Coating layer (C): Formed from a water-based urethane resin paint incorporated with carbon to adjust its volume resistivity to $8.1\times10^7$ Ω·cm.

Coating layer (D): Formed from a paint composed of water-dispersible fluoro resin, water-based polyester resin, and polyvinyl acetal resin, incorporated with carbon to adjust its volume resistivity to $6.8\times10^7$ Ω·cm. The carbon contains 10% oxygen and has pH 7.33.

The charging roll was mounted on a printer and images were produced by using a toner with a particle diameter of 7 μm. Good images were obtained. Further, even after continuous 8000 runs of printing, good images were obtained without any anomaly.

Comparative Example 1

A charging roll was made in the same manner as in Example 1 except that the coating layers (A) and (B) were replaced respectively by the coating layers (E) and (F), which are explained below. The resulting charging roll was found to have a universal hardness of 18.9 N/mm$^2$ at a depth of 7 μm from the surface, a surface Ascar C hardness of 60.1°, and a surface roughness Rz of 0.80 μm in terms of 10-point average according to JIS.

Coating layer (E): Formed from a water-based acrylic resin paint incorporated with conducting titanium oxide to adjust its volume resistivity to $5.6\times10^7$ Ω·cm.

Coating layer (F): Formed from a water-based silicone resin paint incorporated with conducting titanium oxide to adjust its volume resistivity to $8.4 \times 10^7$ Ω·cm.

The charging roll was mounted on a printer and images were produced by using a toner with a particle diameter of 7 μm. Good images were obtained initially. After continuous 4400 runs of printing, however, poor images with spots began to appear. It was found that the roll has toner particles penetrating into its surface.

Comparative Example 2

A charging roll was made in the same manner as in Example 1 except that the coating layers (A) and (B) were replaced respectively by the coating layers (G) and (H), which are explained below. The resulting charging roll was found to have a universal hardness of 19.9 N/mm$^2$ at a depth of 7 μm from the surface, a surface Ascar C hardness of 61.1°, and a surface roughness Rz of 5.4 μm in terms of 10-point average according to JIS.

Coating layer (G): Formed from an organic polyester resin paint incorporated with conducting tin oxide to adjust its volume resistivity to $1.3 \times 10^7$ Ω·cm.

Coating layer (H): Formed from an organic nylon resin paint incorporated with conducting tin oxide to adjust its volume resistivity to $1.5 \times 10^7$ Ω·cm.

The charging roll was mounted on a printer and images were produced by using a toner with a particle diameter of 7 μm. Good images were obtained initially. After continuous 300 runs of printing, however, poor images with spots began to appear. It was found that the roll has toner particles penetrating into its surface.

Example 3

A charging roll was made in the same manner as in Example 1 except that the coating layers (A) and (B) were replaced respectively by the coating layers (I), 275 μm thick, and (J), 6 μm thick, which are explained below. The resulting charging roll was found to have a universal hardness of 5.5 N/mm$^2$ at a depth of 7 μm from the surface, a surface Ascar C hardness of 58.5°, and a surface roughness Rz of 0.58 μm in terms of 10-point average according to JIS. The charging roll was also examined for deformation energy under the following condition for load application and removal by using an ultramicrohardness meter H-100V (from Fischer). The ratio of elastic energy to the sum of elastic energy and plastic energy was 0.55.

Indenter: Regular pyramidal diamond indenter with a dihedral angle of 136° between opposite faces.

Initial load: 0.02 mN.

Maximum load: 100 mN.

Coating layer (I): Formed from a water-based acrylic resin paint incorporated with carbon to adjust its volume resistivity to $5.8 \times 10^7$ Ω·cm.

Coating layer (J): Formed from a paint composed of water-dispersible fluoro resin, vinylidene chloride copolymer latex, and polyvinyl acetal resin, incorporated with carbon to adjust its volume resistivity to $2.9 \times 10^7$ Ω·cm. The carbon contains 10% oxygen and has pH 7.33.

The charging roll was mounted on a printer and images were produced in the same manner as in Example 1. Good images were obtained. Further, even after continuous 8000 runs of printing, good images were obtained without any anomaly.

Example 4

A charging roll was made in the same manner as in Example 3 except that the coating layers (I) and (J) were replaced respectively by the coating layers (K) and (L), which are explained below. The resulting charging roll was found to have a universal hardness of 6.6 N/mm$^2$ at a depth of 7 μm from the surface, a surface Ascar C hardness of 56.0°, and a surface roughness Rz of 0.66 μm in terms of 10-point average according to JIS. The charging roll was also examined for deformation energy under the same condition as in Example 3 by using an ultramicrohardness meter H-100V (from Fischer). The ratio of elastic energy to the sum of elastic energy and plastic energy was 0.6.

Coating layer (K): Formed from a water-based urethane resin paint incorporated with carbon to adjust its volume resistivity to $6.8 \times 10^7$ Ω·cm.

Coating layer (L): Formed from a paint composed of water-dispersible fluoro resin, water-based polyester resin, and polyvinyl acetal resin, incorporated with carbon to adjust its volume resistivity to $5.9 \times 10^7$ Ω·cm. The carbon contains 10% oxygen and has pH 7.33.

The charging roll was mounted on a printer and images were produced in the same manner as in Example 1. Good images were obtained. Further, even after continuous 8000 runs of printing, good images were obtained without any anomaly.

Comparative Example 3

A charging roll was made in the same manner as in Example 3 except that the coating layers (I) and (J) were replaced respectively by the coating layers (M) and (N), which are explained below. The resulting charging roll was found to have a universal hardness of 19.8 N/mm$^2$ at a depth of 7 μm from the surface, a surface Ascar C hardness of 62.1°, and a surface roughness Rz of 0.83 μm in terms of 10-point average according to JIS. The charging roll was also examined for deformation energy under the same condition as in Example 3 by using an ultramicrohardness meter H-100V (from Fischer). The ratio of elastic energy to the sum of elastic energy and plastic energy was 0.39.

Coating layer (M): Formed from a water-based acrylic resin paint incorporated with conducting titanium oxide to adjust its volume resistivity to $4.9 \times 10^7$ Ω·cm.

Coating layer (N): Formed from a water-based silicone resin paint incorporated with conducting titanium oxide to adjust its volume resistivity to $6.8 \times 10^7$ Ω·cm.

The charging roll was mounted on a printer and images were produced by using a toner with a particle diameter of 7 μm. Good images were obtained initially. After continuous 450 runs of printing, however, poor images with spots began to appear. It was found that the roll has toner particles penetrating into its surface.

Comparative Example 4

A charging roll was made in the same manner as in Example 3 except that the coating layers (I) and (J) were replaced respectively by the coating layers (O) and (P), which are explained below. The resulting charging roll was found to have a universal hardness of 21.0 N/mm$^2$ at a depth of 7 μm from the surface, a surface Ascar C hardness of 62.1°, and a surface roughness Rz of 5.9 μm in terms of 10-point average according to JIS.

Coating layer (O): Formed from an organic polyester resin paint incorporated with conducting tin oxide to adjust its volume resistivity to $1.9 \times 10^7$ Ω·cm.

Coating layer (P): Formed from an organic nylon resin paint incorporated with conducting tin oxide to adjust its volume resistivity to $2.6 \times 10^7$ Ω·cm.

The charging roll was mounted on a printer and images were produced in the same manner as above. Good images were obtained initially. After continuous 450 runs of printing, however, poor images with spots began to appear. It was found that the roll has toner particles penetrating into its surface.

Example 5

A charging roll was made in the same manner as in Example 1 except that the coating layers (A) and (B) were replaced respectively by the coating layers (Q), 280 μm thick, and (R), 5 μm thick, which are explained below. The resulting charging roll was found to have a universal hardness of 5.9 $N/mm^2$ at a depth of 7 μm from the surface, a surface Ascar C hardness of 58.8°, and a surface roughness Rz of 0.62 μm in terms of 10-point average according to JIS. The charging roll was also found to have a universal hardness ($H^1$) of 6.1 $N/mm^2$ at a depth of 5 μm from the surface and a universal hardness ($H^2$) of 0.8 $N/mm^2$ at a depth of 50 μm from the depth, with the ratio of $H^1/H^2$ being 7.6.

Coating layer (Q): Formed from a water-based acrylic resin paint incorporated with carbon to adjust its volume resistivity to $7.6\times10^7$ Ω·cm.

Coating layer (R): Formed from a paint composed of water-dispersible fluoro resin, vinylidene chloride copolymer latex, and polyvinyl acetal resin, incorporated with carbon to adjust its volume resistivity to $4.2\times10^7$ Ω·cm. The carbon contains 10% oxygen and has pH 7.33.

The charging roll was mounted on a printer and images were produced in the same manner as in Example 1. Good images were obtained. Further, even after continuous 9000 runs of printing, good images were obtained without any anomaly.

Example 6

A charging roll was made in the same manner as in Example 1 except that the coating layers (A) and (B) were replaced respectively by the coating layers (S), 160 μm thick, and (T), 10 μm thick, which are explained below. The resulting charging roll was found to have a universal hardness of 7.4 $N/mm^2$ at a depth of 7 μm from the surface, a surface Ascar C hardness of 58.0°, and a surface roughness Rz of 0.62 μm in terms of 10-point average according to JIS. The charging roll was also found to have a universal hardness ($H^1$) of 7.1 $N/mm^2$ at a depth of 10 μm from the surface and a universal hardness ($H^2$) of 0.7 $N/mm^2$ at a depth of 100 μm from the depth, with the ratio of $H^1/H^2$ being 10.1.

Coating layer (S): Formed from a water-based urethane resin paint incorporated with carbon to adjust its volume resistivity to $5.5\times10^7$ Ω·cm.

Coating layer (T): Formed from a paint composed of water-dispersible fluoro resin, water-based polyester resin, and polyvinyl acetal resin, incorporated with carbon to adjust its volume resistivity to $5.6\times10^7$ Ω·cm. The carbon contains 10% oxygen and has pH 7.33.

The charging roll was mounted on a printer and images were produced in the same manner as in Example 1. Good images were obtained. Further, even after continuous 9000 runs of printing, good images were obtained without any anomaly.

Comparative Example 5

A charging roll was made in the same manner as in Example 5 except that the coating layers (Q) and (R) were replaced respectively by the coating layers (U) and (V), which are explained below. The resulting charging roll was found to have a universal hardness of 45.1 $N/mm^2$ at a depth of 7 μm from the surface, a surface Ascar C hardness of 61.1°, and a surface roughness Rz of 0.75 μm in terms of 10-point average according to JIS. The charging roll was also found to have a universal hardness ($H^1$) of 46.9 $N/mm^2$ at a depth of 5 μm from the surface and a universal hardness ($H^2$) of 0.7 $N/mm^2$ at a depth of 50 μm from the depth, with the ratio of $H^1/H^2$ being 67.

Coating layer (U): Formed from a water-based acrylic resin paint incorporated with conducting titanium oxide to adjust its volume resistivity to $8.9\times10^7$ Ω·cm.

Coating layer (V): Formed from a water-based silicone resin paint incorporated with conducting titanium oxide to adjust its volume resistivity to $5.4\times10^7$ Ω·cm.

The charging roll was mounted on a printer and images were produced. Good images were obtained initially. After continuous 4700 runs of printing, however, poor images with spots began to appear. It was found that the roll has toner particles penetrating into its surface.

Comparative Example 6

A charging roll was made in the same manner as in Example 5 except that the coating layers (Q) and (R) were replaced respectively by the coating layers (W) and (X), which are explained below. The resulting charging roll was found to have a universal hardness of 54.0 $N/mm^2$ at a depth of 7 μm from the surface, a surface Ascar C hardness of 62.1°, and a surface roughness Rz of 4.9 μm in terms of 10-point average according to JIS. The charging roll was also found to have a universal hardness ($H^1$) of 55.6 $N/mm^2$ at a depth of 5 μm from the surface and a universal hardness ($H^2$) of 0.9 $N/mm^2$ at a depth of 50 μm from the depth, with the ratio of $H^1/H^2$ being 61.7.

Coating layer (W): Formed from an organic polyester resin paint incorporated with conducting tin oxide to adjust its volume resistivity to $3.4\times10^7$ Ω·cm.

Coating layer (X): Formed from an organic acrylic resin paint incorporated with conducting tin oxide to adjust its volume resistivity to $2.3\times10^7$ Ω·cm.

The charging roll was mounted on a printer and images were produced in the same manner as in Example 1. Good images were obtained initially. After continuous 400 runs of printing, however, poor images with spots began to appear. It was found that the roll has toner particles penetrating into its surface.

Example 7

A charging roll was made up of a 3000 μm thick elastic layer (B), a 280 μm thick coating layer (Y), and a 6 μm thick coating layer (Z), which are formed consecutively one over another on a metal shaft. These layers are explained below. The resulting charging roll was found to have a universal hardness of 5.5 $N/mm^2$ at a depth of 7 μm from the surface, a surface Ascar C hardness of 58.1°, and a surface roughness Rz of 0.6 μm in terms of 10-point average according to JIS.

Elastic layer (B): A urethane foam having a density of 0.5 $g/cm^3$, formed from polyester polyol and isocyanate and incorporated with carbon. This urethane foam has a storage modulus (E') of $7.5\times10^6$ $dyn/cm^2$.

Coating layer (Y): Formed from a water-based acrylic resin paint incorporated with carbon to adjust its volume resistivity to $6\times10^7$ Ω·cm. This coating layer has a storage modulus (E') of $2.1\times10^8$ $dyn/cm^2$.

Coating layer (Z): Formed from a paint composed of water-dispersible fluoro resin, vinylidene chloride copolymer latex, and polyvinyl acetal resin, incorporated with carbon to adjust its volume resistivity to $7.1\times10^7$ Ω·cm. The carbon contains 10% oxygen and has pH 7.33. This coating layer has a storage modulus (E') of $4.0\times10^9$ dyn/cm$^2$.

The charging roll was mounted on a printer and images were produced in the same manner as in Example 1. Good images were obtained. Further, even after continuous 6000 runs of printing, good images were obtained without any anomaly.

Example 8

A charging roll was made in the same manner as in Example 7 except that the coating layers (Y) and (Z) were replaced respectively by the coating layers (a), 150 μm thick, and (b), 10 μm thick, which are explained below. The resulting charging roll was found to have a universal hardness of 6.1 N/mm$^2$ at a depth of 7 μm from the surface, a surface Ascar C hardness of 63.1°, and a surface roughness Rz of 0.9 μm in terms of 10-point average according to JIS.

Coating layer (a): Formed from a water-based urethane resin paint incorporated with carbon to adjust its volume resistivity to $7\times10^7$ Ω·cm. This coating layer has a storage modulus (E') of $9.7\times10^7$ dyn/cm$^2$.

Coating layer (b): Formed from a paint composed of water-dispersible fluoro resin and polyvinyl acetal resin, incorporated with carbon to adjust its volume resistivity to $4.1\times10^7$ Ω·cm. The carbon contains 10% oxygen and has pH 7.33. This coating layer has a storage modulus (E') of $1.0\times10^9$ dyn/cm$^2$.

The charging roll was mounted on a printer and images were produced in the same manner as in Example 1. Good images were obtained. Further, even after continuous 6000 runs of printing, good images were obtained without any anomaly.

Comparative Example 7

A charging roll was made in the same manner as in Example 7 except that the coating layers (Y) and (Z) were replaced respectively by the coating layers (d) and (e), which are explained below. The resulting charging roll was found to have a universal hardness of 11.1 N/mm$^2$ at a depth of 7 μm from the surface, a surface Ascar C hardness of 61.1°, and a surface roughness Rz of 1.1 μm in terms of 10-point average according to JIS.

Coating layer (d): Formed from a urethane resin paint incorporated with carbon to adjust its volume resistivity to $8\times10^7$ Ω·cm. This coating layer has a storage modulus (E') of $5\times10^7$ dyn/cm$^2$.

Coating layer (e): Formed from an acrylic resin paint incorporated with carbon to adjust its volume resistivity to $4\times10^7$ Ω·cm. This coating layer has a storage modulus (E') of $4\times10^{10}$ dyn/cm$^2$.

The charging roll was mounted on a printer and images were produced in the same manner as in Example 1. Good images were obtained initially. After 3400 runs of printing intended for continuous 6000 runs, poor images with spots began to appear. It was found that the roll has toner particles penetrating into its surface.

Example 9

A charging roll was made up of a 3000 μm thick elastic layer (C), a 300 μm thick coating layer (f), and a coating layer (g), which are formed consecutively one over another on a metal shaft. These layers are explained below. The resulting charging roll was found to have a universal hardness of 6.1 N/mm$^2$ at a depth of 7 μm from the surface, a surface Ascar C hardness of 61.1°, and a surface roughness Rz of 0.5 μm in terms of 10-point average according to JIS.

Elastic layer (C): A polyurethane foam having a density of 0.5 g/cm$^3$, formed from polyester polyol and isocyanate and incorporated with carbon. This polyurethane foam has a storage modulus (E') of $4.3\times10^5$ dyn/cm$^2$, with a tan δ of 0.10, which is the ratio of loss modulus (E") to storage modulus (E').

Coating layer (f): Formed from a water-based acrylic resin paint incorporated with carbon to adjust its volume resistivity to $5\times10^7$ Ω·cm. This coating layer has a tan δ of 0.39, which is the ratio of loss modulus (E") to storage modulus (E').

Coating layer (g): Formed from a paint composed of water-dispersible fluoro resin, vinylidene chloride copolymer latex, and polyvinyl acetal resin, incorporated with carbon to adjust its volume resistivity to $5\times10^7$ Ω·cm. The carbon contains 10% oxygen and has pH 7.33.

The charging roll was mounted on a printer and images were produced in the same manner as in Example 1. Good images were obtained. Further, even after continuous 6000 runs of printing, good images were obtained without any deterioration.

This charging roll gave a noise level of 50 dB which was too low to cause problems when it received a DC voltage of 7.0 kV and an AC voltage (Vpp) of 2.0 kV (500 Hz) superimposed thereon while it was running in contact under pressure with the photosensitive body.

Comparative Example 8

A charging roll was made in the same manner as in Example 9 except that the elastic layer (C) was replaced by the elastic layer (D) and the coating layer (f) was replaced by the coating layer (h) explained below. The resulting charging roll was found to have a universal hardness of 10.5 N/mm$^2$ at a depth of 7 μm from the surface, a surface Ascar C hardness of 59.8°, and a surface roughness Rz of 0.8 μm in terms of 10-point average according to JIS.

Elastic layer (D): Formed from NBR rubber incorporated with chlorinated paraffin and carbon. This rubber has a storage modulus (E') of $8.5\times10^7$ dyn/cm$^2$, with a tan δ of 0.32, which is the ratio of loss modulus (E") to storage modulus (E').

Coating layer (h): Formed from a urethane resin paint incorporated with carbon to adjust its volume resistivity to $7.1\times10^7$ Ω·cm. This coating layer has a tan δ of 0.12, which is the ratio of loss modulus (E") to storage modulus (E').

This charging roll gave a noise level of 51 dB which was too low to cause problems when it was tested in the same way as in Example 9. However, in the printing test intended for continuous 6000 runs, poor images with spots began to appear after continuous 3200 runs. It was found that the roll has toner particles penetrating into its surface and accumulating on its surface.

Example 10

A charging roll was made up of a 3000 μm thick elastic layer (E), a 300 μm thick coating layer (i), and an coating layer (j), which are formed consecutively one over another on a metal shaft. These layers are explained below. The resulting charging roll was found to have a universal hardness of 7.8 N/mm$^2$ at a depth of 7 $\mu$m from the surface, a surface Ascar C hardness of 59.1°, and a surface roughness Rz of 0.7 $\mu$m in terms of 10-point average according to JIS. The roll surface was found to have a contact angle with water of 80.5 .

Elastic layer (E): A polyurethane foam having a density of 0.5 g/cm$^3$, formed from polyester polyol and isocyanate and incorporated with carbon.

Coating layer (i): Formed from a water-based acrylic resin paint incorporated with carbon to adjust its volume resistivity to 5x10$^7$ Ω·cm.

Coating layer (j): Formed from a paint composed of water-dispersible fluoro resin, vinylidene chloride copolymer latex, and polyvinyl acetal resin, incorporated with carbon to adjust its volume resistivity to 5.1x10$^7$ Ω·cm, and also incorporated with an epoxy-based crosslinking agent. The carbon contains 10% oxygen and has pH 7.33. The amount of the crosslinking agent was 5 phr. The content of water-insoluble matter in the coating layer (j) was 81.5%.

The charging roll was mounted on a printer and images were produced in the same manner as in Example 1. Good images were obtained. Further, even after continuous 6000 runs of printing, good images were obtained without any deterioration.

Comparative Example 9

A charging roll was made in the same manner as in Example 10 except that the coating layers (i) and (j) were replaced respectively by the coating layers (m) and (n), which are explained below. The resulting charging roll was found to have a universal hardness of 18.2 N/mM$^2$ at a depth of 7 $\mu$m from the surface, a surface Ascar C hardness of 61.20 , and a surface roughness Rz of 9.5 $\mu$m in terms of 10-point average according to JIS. The roll surface was found to have a contact angle with water of 75.60.

Coating layer (m): Formed from a urethane paint in toluene incorporated with ketjen carbon black to adjust its volume resistivity to 7x10$^7$ Ω·cm.

Coating layer (n): Formed from a nylon paint in methanol incorporated with ketjen carbon black to adjust its volume resistivity to 2x10$^7$ Ω·cm. The content of water-insoluble matter in the coating layer (n) was 96.7%.

The charging roll was tested for printing performance in the same as in Example 1. Poor images with spots appeared from the beginning. It was found that the roll has toner particles caught by surface irregularities.

What is claimed is:

1. A charging member for charging a latent image supporting body in electrophotoprocess; wherein said charging member has a surface whose universal hardness is no higher than 10 N/mm$^2$ at a depth equivalent to the diameter of toner particles.

2. A charging member for charging a latent image supporting body in electrophotoprocess; wherein said charging member has a surface whose universal hardness is no higher than 10 N/mm$^2$ at a depth of 7 $\mu$m.

3. A charging member as defined in claim 1, whose surface recovers from deformation such that the ratio of elastic energy to the sum of elastic energy and plastic energy is no less than 0.4 when it experiences deformation for measurement of universal hardness.

4. A charging member as defined in claim 1, which comprises an elastic layer and one or more outer layers formed thereon, with or without an intermediate layer interposed between them.

5. A charging member as defined in claim 4, which satisfies the condition of $H^1/H^2<50$, where $H^1$ is a universal hardness at a depth corresponding to the thickness of the outermost layer and $H^2$ is a universal hardness at a depth 10 times as much as said depth corresponding to the thickness of the outermost layer.

6. A charging member as defined in claim 4, which satisfies the condition that the ratio of the storage modulus (E') of one layer to the storage modulus (E') of its adjacent layer is no larger than 500.

7. A charging member as defined in claim 6, in which the elastic layer has a storage modulus (E') no higher than 5x10$^7$ dyn/cm.

8. A charging member as defined in claim 7, in which each layer as a constituent of the outer layer has a storage modulus no higher than 2.5x10$^{10}$ dyn/cm$^2$.

9. A charging member as defined in claim 4, in which the elastic layer has a storage modulus no higher than 5x10$^7$ dyn/cm$^2$ and a tan δ smaller than 0.3 as the ratio of loss modulus (E") to storage modulus (E').

10. A charging member as defined in claim 9, in which the outer layer has a tan δ of 0.15–0.5 as the ratio of loss modulus (E") to storage modulus (E').

11. A charging member as defined in claim 4, in which at least the outermost layer of the outer layers is a coating film of water-based resin and has water insolubility no lower than 70% calculated from the equation (1) below), $$\text{Water insolubility } (\%)=(B/A)\times 100 \quad (1)$$

where A is the weight of the coating film before dipping in water and B is the weight of the coating film after dipping in water at 25° C. for 24 hours.

12. A charging member as defined in claim 1, in which the surface has an Ascar C hardness no higher than 65°.

13. A charging member as defined in claim 1, in which the surface has a surface roughness Rz no higher than 4 $\mu$m in terms of 10-point average according to JIS.

14. A charging member as defined in claim 4, in which the elastic layer is of urethane foam having a density of 0.05–0.9 g/cm$^3$.

15. A charging member as defined in claim 4, in which the outer layer contains one or more water-based resins selected from fluoro resin, polyvinyl acetal resin, vinylidene chloride resin, urethane resin, polyester resin, and acrylic resin.

16. A charging member as defined in claim 4, in which the coating layer contains carbon containing no less than 5% oxygen and having a pH no lower than 5.

17. A charging member as defined in claim 16, in which the outermost layer of the outer layers is a coating film of water-based fluoro resin which contains carbon containing no less than 5% oxygen and having a pH no lower than 5.

18. A charging device for charging a latent image supporting body in electrophotoprocess; wherein said charging device includes the charging member defined in claim 1 or 2.

* * * * *